Patented Sept. 19, 1933

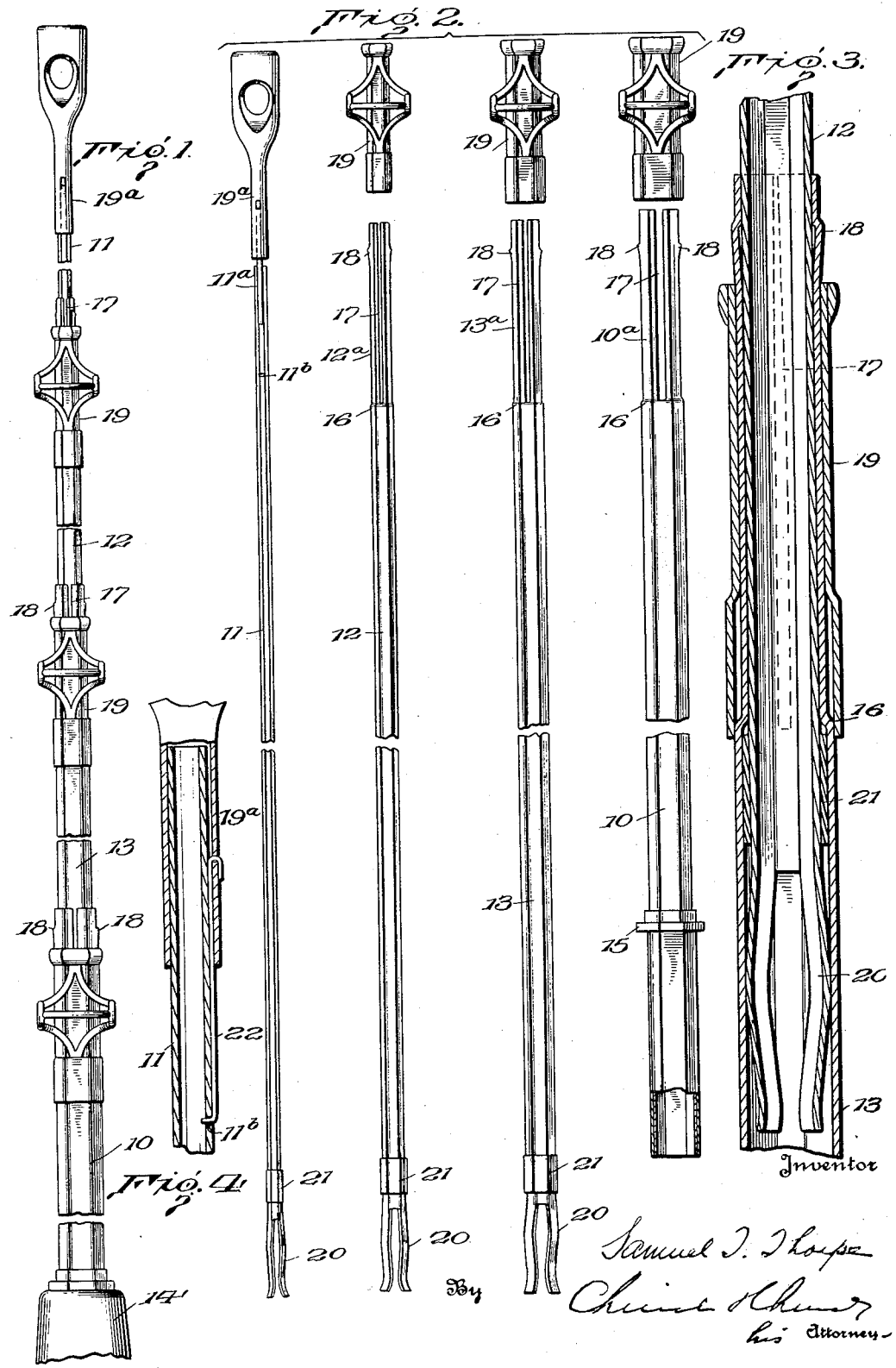

1,927,724

UNITED STATES PATENT OFFICE 1,927,724

FISHING ROD

Samuel T. Thorpe, Bristol, Conn., assignor to The Horton Manufacturing Company, Bristol, Conn., a corporation of Connecticut Application June 6, 1931. Serial No. 542,622

4 Claims. (Cl. 43—18)

This invention relates to improvements in fishing rods and particularly to fishing rods composed of a plurality of sections that telescope one within the other whereby the rod may be reduced to a minimum length for storage or carrying purposes but may be readily extended to a maximum length when it is to be used.

The primary object of the invention is to provide a fishing rod composed of a plurality of telescoping sections wherein said sections cannot possibly be detached from one another by movement in the direction in which they are moved when the rod is to be extended for use but wherein said sections may be readily detached from one another by movement in the opposite direction. In this way, the rod may be readily disassembled and new sections substituted for any section, or sections, that may be broken, such substitution being so easily made that it can be done by the owner of the rod. This eliminates the necessity of returning the rod to the manufacturer for the purpose of repairing.

As has been mentioned, it is impossible to detach the sections from one another by moving them with respect to each other, as is done when the rod is to be extended for use. In this connection, the invention also contemplates the provision of a novel form of stop for limiting the movement of the rod sections with respect to one another in the direction in which they are normally moved for extending the rod to its full or any intermediate length.

With these and other objects in view, the invention consists in certain details of construction and combinations and arrangements of parts, all as will hereinafter be more fully described and the novel features thereof particularly pointed out in the appended claims.

In the accompanying drawing:

Figure 1 is an elevational view of a sectional fishing rod, the sections being partly broken away and only a portion of the handle being illustrated;

Fig. 2 is composed of a series of views illustrating the sections of the rod disassembled and the line guides removed from the respective sections on which they are normally carried;

Fig. 3 is a section taken longitudinally through the joint between one of the pairs of telescoping sections.

Fig. 4 is a detailed sectional view of the tip.

The rod may, of course, consist of any number of sections, a handle engaging section 10, a tip end section 11 and two intermediate sections 12 and 13 being illustrated in the present instance. Preferably, the several sections are made hexagonal in cross section to prevent rotation of one section with respect to another. The handle engaging section 10 is adapted to be frictionally retained in a socket, also hexagonal in cross section, in the handle 14. The section 10 may be provided with a sleeve and abutment 15 for limiting the insertion of said section in the handle.

Section 10 is of tubular construction, being open at both ends, as shown in Figure 2. The end of said section remote from the handle engaging end is of reduced cross section, as indicated at 10a, forming a shoulder 16 on both the inner and outer surfaces of the section. The end portion 10a is formed with one or more slits 17 therein and on its exterior it is also formed with one or more camming surfaces 18. By reason of the slits 17 the end portion 10a may be contracted to permit the line guide member 19 carried thereby to be placed thereon as shown in Figure 1. Section 13 has its end portion 13a likewise formed with slits 17 and camming surfaces 18 to permit its line guide member 19 being placed thereon. Section 13 is also formed with the shouldered portion 16. At its opposite end, section 13 is provided with a plurality of spring fingers 20 and a shoulder 21 is provided at this end for a purpose hereinafter described. Section 12 is a duplicate of section 13 except that it is not quite as large in diameter. It has the spring fingers 20 and the shoulder 21 at one end and at its opposite end 12a, it has the shouldered portion 16, slots 17 and camming surfaces 18. This slotted end 12a is adapted to receive a line guide 19. Section 11, like sections 12 and 13, has a shoulder 21 and spring fingers 20 at one end. Its opposite end 11a which may be cylindrical in cross section, is adapted to receive the line guide member 19a, this member being referred to as the tip. Sections 11, 12 and 13 are all of tubular construction and open at both ends as in the case of section 10.

To assemble the rod, line guide 19 is placed on the slitted end of section 10 and the end 13a of section 13 is inserted in the handle engaging end of section 10, and said section 13 projected through section 10. Line guide 19 is then placed on the projecting slotted end of section 13, after which the slotted end of section 12 is inserted in the two assembled sections and projected through both of said sections. Line guide 19 is then placed on the projecting slotted end of section 12, after which the section 11 is inserted in the previously assembled sections and projected through all three of them. The line guide or tip 19a is then placed upon the projecting end 11a of section 11. The frictional engagement between tip 19a and section 11 may be relied upon to prevent accidental displacement, but preferably the tip has attached thereto a strip of spring steel 11a formed with an offset end engaging in an opening 11b in section 11. By inserting a knife blade or the like beneath the strip 11a, it can be detached from section 11 to permit removal of the tip.

As shown in Figure 3, the shoulders 21 of the respective sections engage the interior shoulder 16 on the section within which it telescopes to prevent the projection of the inner section all the way through the outer section. In this way, the rod can be fully extended by projecting each section all the way through its mating section until the shoulders 21 and 16 come into engagement with each other. It is not, however, necessary to always use the rod in its fully extended position because by reason of the slidable, removable line guides 19 and the camming surfaces 18 on the several sections, the several sections can be releasably locked together at any point throughout their length. That is, each section can be projected through its mating section any desired extent whenever the line guide 19 is not in engagement with the camming surfaces 18 but after each two telescoping or mating sections have been adjusted to desired points they may be clamped there by moving line guide 19 onto the camming surfaces 18.

It will also be apparent that whenever the line guides 19 are in engagement with the camming surfaces 18 and the tip 19a is on section 11, it will be impossible to disassemble the several sections. This can only be accomplished by first removing tip 19a and disengaging the line guide 19 on section 12 from the camming surfaces 18 on that section. Section 11 can then be pushed back through the other sections and completely removed. The line guide 19 is then removed from section 12 and the line guide on section 13 disengaged from the camming surfaces 18 on the latter section. Section 12 can then be pushed back through the two remaining sections and completely removed. The line guide 19 may then be removed from section 13 and guide 19 on section 10 disengaged from the camming surfaces 18 on that section. Sections 13 may then be withdrawn backwardly from section 10 so that the rod is then completely disassembled. Of course, if only one new section is to be replaced in the rod it may not be necessary to disassemble all the sections but, as shown, the entire rod may be disassembled whenever desired.

It will be understood that assembly and disassembly of the sections can be accomplished only when the several parts are disengaged from the handle 14. It will also be understood that the line guides 19 cannot be removed from the rod when the sections are assembled because the presence of one section within the other of each pair of telescoping sections prevents the guides being moved completely over the camming surfaces. In other words, the slotted ends of the rod sections cannot be contracted sufficiently to free the line guides.

What I claim is:

1. A fishing rod composed of tubular sections telescoping one within the other, one section of each two telescoping sections having one end reduced in cross section to form a shoulder on the interior thereof, and the other section of each two telescoping sections having a shoulder thereon engageable with the first mentioned shoulder to limit movement of said sections with respect to one another in one direction, said sections being removable from one another by movement in the opposite direction, and means for releasably clamping each pair of sections against movement in either direction.

2. A fishing rod composed of a plurality of telescoping sections, each section being removable to a limited extent from one end of the section in which it telescopes to elongate the rod, and means for preventing total withdrawal of each section from said end of the section in which it telescopes, each of said sections being totally removable from the opposite end of the section in which it telescopes.

3. A fishing rod composed of a plurality of telescoping sections, each section being removable to a limted extent from one end of the section in which it telescopes to elongate the rod, means preventing total removal of each section from said end of the section in which it telescopes, each section being wholly removable from the opposite end of the section in which it telescopes, and means for releasably clamping the sections together in telescoping relation.

4. A fishing rod having a tubular handle engaging section open at each end, a second section telescoping within said handle section, said second section being removable to a limited extent from one end of the handle section to elongate the rod, and means for preventing total withdrawal of said second section from said end of the handle section, said second section being wholly removable from the other end of the handle section.

SAMUEL T. THORPE.